United States Patent [19]
Matsuhashi

[11] Patent Number: 5,565,165
[45] Date of Patent: Oct. 15, 1996

[54] METHOD FOR BLOW MOLDING HOLLOW ARTICLES

[75] Inventor: Setsu Matsuhashi, Yokohama, Japan

[73] Assignee: Toyo Seikan Kaisha, Ltd., Tokyo, Japan

[21] Appl. No.: 293,820

[22] Filed: Aug. 22, 1994

[51] Int. Cl.⁶ .......................... B29C 49/18; B29C 49/60
[52] U.S. Cl. .......................... 264/526; 264/529; 425/536
[58] Field of Search .......................... 264/526, 529, 264/524, 525, 540; 425/536

[56] References Cited

U.S. PATENT DOCUMENTS

| | | | |
|---|---|---|---|
| 3,089,185 | 5/1963 | Di Settenbrini | 264/526 |
| 3,114,931 | 12/1963 | Pelikan | 264/526 |
| 3,338,998 | 8/1967 | Di Settembrini | 264/526 |
| 3,450,805 | 6/1969 | Chesser | 264/526 |
| 3,492,106 | 1/1970 | Peters et al. . | |
| 3,592,886 | 7/1971 | Havely | 264/526 |
| 4,025,276 | 5/1977 | Peters . | |
| 4,092,389 | 5/1978 | Sakurai | 264/526 |

FOREIGN PATENT DOCUMENTS

| | | | |
|---|---|---|---|
| 1281036 | 11/1961 | France | 264/524 |
| 2306820 | of 1976 | France . | |
| 58-116132 | of 1983 | Japan . | |
| 2117809 | of 1990 | Japan . | |
| 4077231 | of 1992 | Japan . | |

Primary Examiner—Catherine Timm
Attorney, Agent, or Firm—Thomas R. Morrison; Christopher R. Pastel

[57] ABSTRACT

In a blow molding process, a fused thermoplastic polymer parison is interposed between a pair of split molds. The split molds are closed around the parison to seal the ends. A small diameter hollow needle is inserted through one of the split molds and fluid is blown into the parison forming a balloon. After the balloon begins to form, a large diameter hollow needle is inserted while internal pressure is applied to the parison via the small diameter hollow needle, and a large amount of fluid is blown in. This process is highly productive and reduces the conventional blow molding cycle by 60 percent due to the rapid cooling of the hollow article.

10 Claims, 7 Drawing Sheets

METHOD FOR BLOW MOLDING HOLLOW ARTICLES

BACKGROUND OF THE INVENTION

The present invention relates to an improved method and device for blow molding and shaping hollow articles. In particular, the present invention relates to a highly productive method and device for direct blow molding which allows rapid cooling of articles shaped by parison expansion or blowing.

Blow molding is a technique adopted from the glass industry for molding plastic bottles and other articles from thermoplastic material. The direct blow molding process has been widely used for the shaping of hollow articles made of thermoplastic synthetic resins. It consists of blowing a thin balloon of molten thermoplastic material against the inside walls of a mold and chilling it to a rigid solid. In its most common form, this process includes extruding or injecting a parison downward between the opened halves of a mold, closing the mold to pinch off and seal the parison at top and bottom, injecting air or other fluid through a needle inserted through the parison wall, cooling the mass in contact with the mold, opening the mold, and removing the formed article.

It is difficult to insert a thick needle into the parison to inject air or other fluid because the parison is relatively soft at high temperatures. It is therefore necessary to use a hollow needle having a thin and sharp tip. Air is a fluid and as such is limited in its ability to flow through an orifice. If the air entrance channel is too small, the required blow time is excessively long or the pressure exerted on the parison is inadequate to reproduce the surface details of the mold. Furthermore, while a small amount of air may be adequate for expanding the parison, it might not be enough for cooling the expanded hollow article. Although small articles can be shaped this way, it is not possible to shape large articles.

In the direct blow molding method, a technique used to prevent cosmetic damage to the shaped article includes forming an exhaust opening through an unnecessary section of the article that is cut off after formation to serve as an opening (referred to as the flash section). Another technique includes inserting the hollow needle from an angle perpendicular to the main axis of the parison. In blowing air into the hollow article from this position, it is desirable to blow in the direction of the body of the article, i.e., downward along the axis of the parison, so that the air can flow easily. However, thin needles can only be designed with an opening at the tip of the needle due to the size constraints. A needle bent to a 90 degree angle cannot penetrate the parison. Thus, it is only possible to blow air in a direction perpendicular to the direction of the parison axis, and effective circulation of the air within the parison is prevented. Since a large amount of air for cooling can not be blown into the parison, more time is required for cooling the article.

Cooling is particularly important because it consumes much of the cycle time and therefore bears on product economics. Cooling can take as much as two thirds of the entire "mold-closed" time in a cycle. Results are best when uniform temperatures are maintained throughout the mold. Standard cooling techniques are directed towards either external systems or internal systems or a combination thereof. External systems cool the mold by circulating coolants around the outside or through the walls of the mold. Mold cooling can be improved by increasing the rate of coolant flow through the mold or by making the mold of material with better heat transfer.

Internal systems rely on injecting fluids such as air, a mixture of air and water, or carbon dioxide into the blown part to cool the inside of the parts while they are in the mold. Typical commercial methods include (1) injecting liquid carbon dioxide into the blown part, followed by vaporization, superheating, and exhaustion of the coolant as a gas through the blow pin, (2) injecting highly pressurized moist air into the blown part where it expands to normal blow pressures and produces a cooling effect, (3) passing air through a refrigeration system and into the hot parison, and (4) cycling normal plant air into and out of the blown parts by a series of timers and valves. The size of the hollow needle used for injecting the fluid limits both the speed of the process and the size of articles made using the process.

OBJECTS AND SUMMARY OF THE INVENTION

Accordingly, it is an object of the present invention to provide a method and device for the direct blow molding of hollow articles using a large diameter hollow needle in addition to a conventional small diameter hollow needle. A further object of the present invention is to provide a highly productive method and device for shaping hollow articles made of thermoplastic polymers.

When shaping a hollow article by the direct-blow method according to the present invention, blowing fluid through a large diameter hollow needle allows a large amount of fluid to be blown into the parison and provide effective cooling. This makes it possible to form large articles. In addition, using a large diameter hollow needle allows the position of its orifice to be changed freely, thus allowing efficient expansion of the parison. The orifice need not be located at a tip of the large diameter hollow needle.

Large diameter hollow needles can not directly puncture a parison wall because the parison wall is relatively soft at high temperatures. When the large diameter needle is forced against the outside of the parison wall, the softness of the thermoplastic material permits substantial deformation. However, by initially using a small diameter hollow needle to puncture the parison and blow fluid into the parison, the parison is given internal pressure. This internal pressure counteracts the elasticity of the balloon wall and thereby makes it possible to insert the large diameter hollow needle shortly after the small diameter hollow needle is inserted without producing undesired distortion. By using a combination of a large diameter hollow needle and a small diameter hollow needle, the present invention enables the use of larger diameter needles than could be used in the prior art.

Using a large diameter needle allows a large amount of fluid to be rapidly blown into the parison. This permits the rapid expansion of the parison as well as adequate cooling, thus making it possible to improve the formation process. Since a large amount of fluid can be blown in, large bottles can be formed quickly and efficiently.

A parison having a bottom or a tube-shaped parison can be used as the parison in the present invention. The flash section is arranged in the area above the section that forms the opening of the article. Arranging a protrusion or cavity in the flash section where the large diameter hollow needle is inserted keeps this section thin during blowing, which is especially desirable because it makes inserting the large diameter hollow needle easier.

Briefly stated, in a blow molding process, a fused polymer parison is interposed between a pair of split molds. The split molds are closed around the parison to seal the ends. A small diameter hollow needle is inserted through one of the split molds and fluid is blown into the parison forming a balloon. After the balloon begins to form, a large diameter hollow needle is inserted while internal pressure is applied to the parison via the small diameter hollow needle, and a large amount of fluid is blown in. This process is highly productive and reduces the conventional blow molding cycle by 60 percent due to the rapid cooling of the hollow article.

The present invention also provides a device for blow molding hollow articles including a pair of split molds arranged so they can be freely opened and closed and having an open position for receiving a parison and a closed position for forming a mold. The mold has an upper pinch-off section, a flash section, a cavity, and a lower pinch-off section. The device includes a plurality of drive devices for inserting and retracting a plurality of hollow needles into and out of the parison and for supplying a fluid to each of the hollow needles. The drive devices are arranged in a first one of the pair of split molds in an area corresponding to the flash section of the mold. The device also includes means for exhausting the fluid from the parison.

According to a feature of an embodiment of the present invention, each of the drive devices includes a fluid cylinder containing one of the hollow needles, first and second fluid supply openings disposed on a side of the fluid cylinder and having an open position and a closed position whereby the first fluid supply opening being closed and the second fluid supply opening being open causes the hollow needle in the fluid cylinder to be inserted into the parison and the fluid to flow through the hollow needle into the parison, and whereby the first fluid supply opening being open and the second fluid supply opening being closed causes the hollow needle to be retracted from the parison.

According to an embodiment of the present invention, a device for blow molding hollow articles includes a pair of split molds arranged so they can be freely opened and closed and having an open position for receiving a parison and a closed position for forming a mold which has an upper pinch-off section, a flash section, a cavity, and a lower pinch-off section. A plurality of hollow needles are arranged in one of the pair of split molds in an area corresponding to the flash section of the mold. The device includes means for controlling each hollow needle whereby each hollow needle is inserted into the parison and retracted from the parison, means for supplying a fluid to each of the hollow needles, and means for exhausting the fluid from the parison.

According to a feature of the invention, the plurality of hollow needles includes a small diameter hollow needle and a large diameter hollow needle.

According to a feature of the invention, the means for controlling includes a first cam linked to the small diameter hollow needle whereby the small diameter hollow needle is inserted into the parison and retracted from the parison, a second cam linked to the large diameter hollow needle whereby the large diameter hollow needle is inserted into the parison and retracted from the parison, and the first and second cams are linked.

According to an embodiment of the invention, a device for blow molding hollow articles includes a pair of split molds arranged so they can be freely opened and closed and having an open position for receiving a parison and a closed position for forming a mold, the mold having an upper pinch-off section, a flash section, a cavity, and a lower pinch-off section, a small diameter hollow needle and a large diameter hollow needle arranged in one of the pair of split molds in an area corresponding to the flash section of the mold, means for controlling the small diameter hollow needle whereby the small diameter hollow needle is inserted into the parison and retracted from the parison, means for controlling the large diameter hollow needle whereby the large diameter hollow needle is inserted into the parison and retracted from the parison, means for supplying a first fluid to the small diameter hollow needle, means for supplying a second fluid to the large diameter hollow needle, and means for exhausting the first and second fluids from the parison.

The present invention provides for a method for blow molding hollow articles which includes interposing a thermoplastic parison between a pair of split molds, closing the pair of split molds thereby sealing both ends of the parison, inserting a small diameter hollow needle into the parison, blowing a fluid through the small diameter hollow needle into the parison thereby forming a balloon by expanding the parison into a hollow space inside the pair of split molds, inserting a large diameter hollow needle into the balloon, blowing the fluid through the large diameter hollow needle into the balloon, circulating the fluid inside the parison by forming an exhaust opening in the parison, cooling the balloon thereby forming the hollow article, exhausting the fluid from the balloon, retracting the small diameter hollow needle from the balloon, retracting the large diameter hollow needle from the balloon, opening the pair of split molds, and removing the hollow article from the pair of split molds.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 7b is a section view of the cam movement of part A of FIG. 7a.

FIG. 7c is a section view of the cam movement of part B of FIG. 7a.

DETAILED DESCRIPTION OF THE PREFERRED EMBODIMENTS

Figure 1:
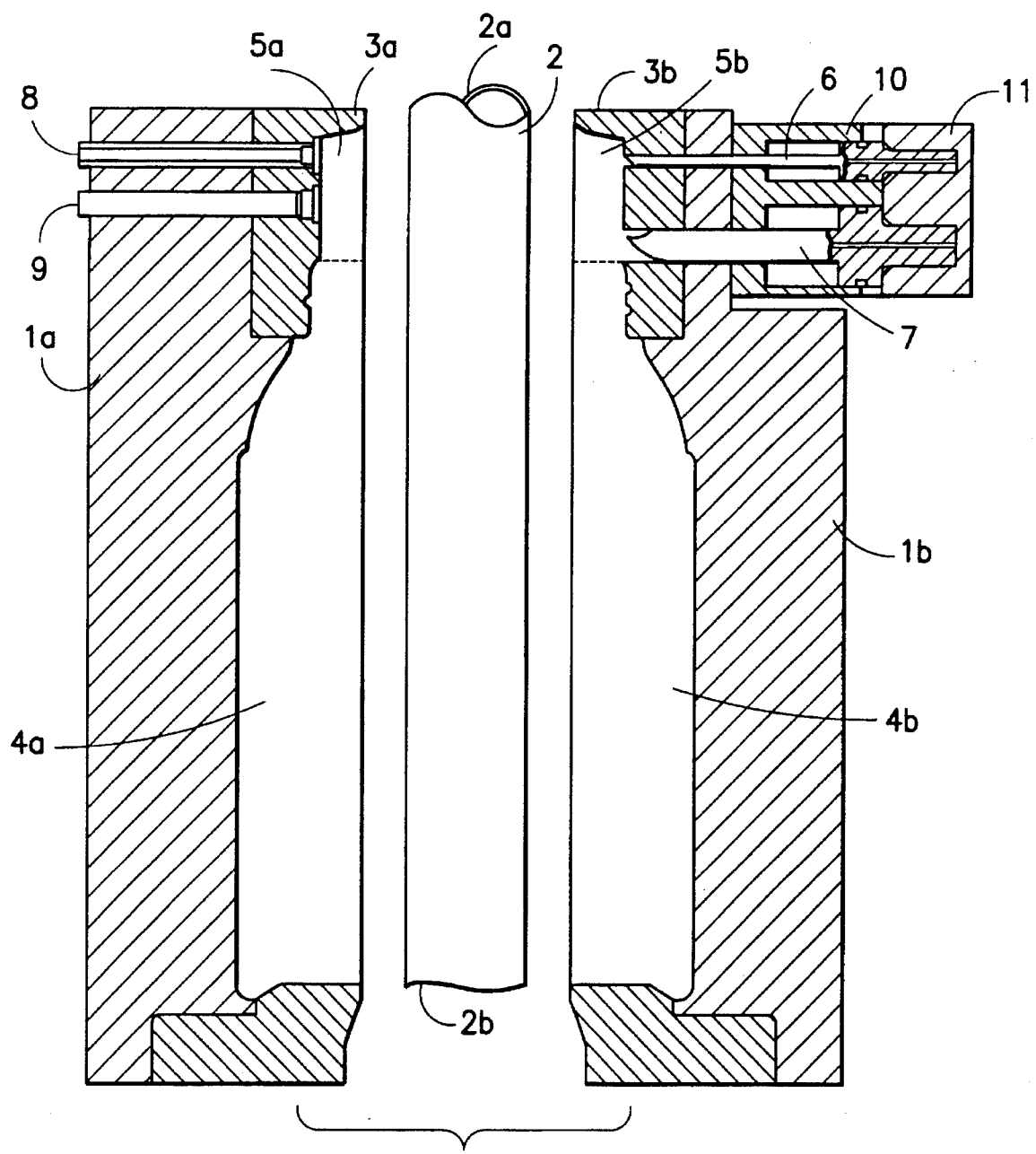
FIG. 1 is a section view of an embodiment of the present invention showing a split mold in an open state and hollow needles in an inactive (retracted) position.

Referring to FIG. 1, a pair of split molds 1a and 1b, which can be opened and closed, include pinch-off sections 3a and 3b, cavity sections 4a and 4b, and flash cavity sections 5a and 5b. Pinch-off sections 3a and 3b seal parison top 2a when the split molds close. Parison bottom 2b is already closed from the extrusion process that produces parison 2. Small diameter hollow needle 6 and large diameter hollow needle 7 are arranged at the top of split mold 1b such that, when inserted into parison 2, they penetrate flash cavity section 5b. Fluid supply mechanism 10 and control device 11 allow for air or other fluid to be injected into parison 2 through small diameter hollow needle 6 and large diameter hollow needle 7 at the proper times. Exhaust opening formation mechanism 8 allows any air trapped between parison 2 and a side of closed split molds to vent, and also allows the injected air or other fluid to vent to the outside of parison 2 and mold after expansion of parison 2 is completed. After the hollow article cools sufficiently, knockout pin 9 removes the cooled hollow article from split mold 1b as split molds 1a and 1b separate.

Figure 2:
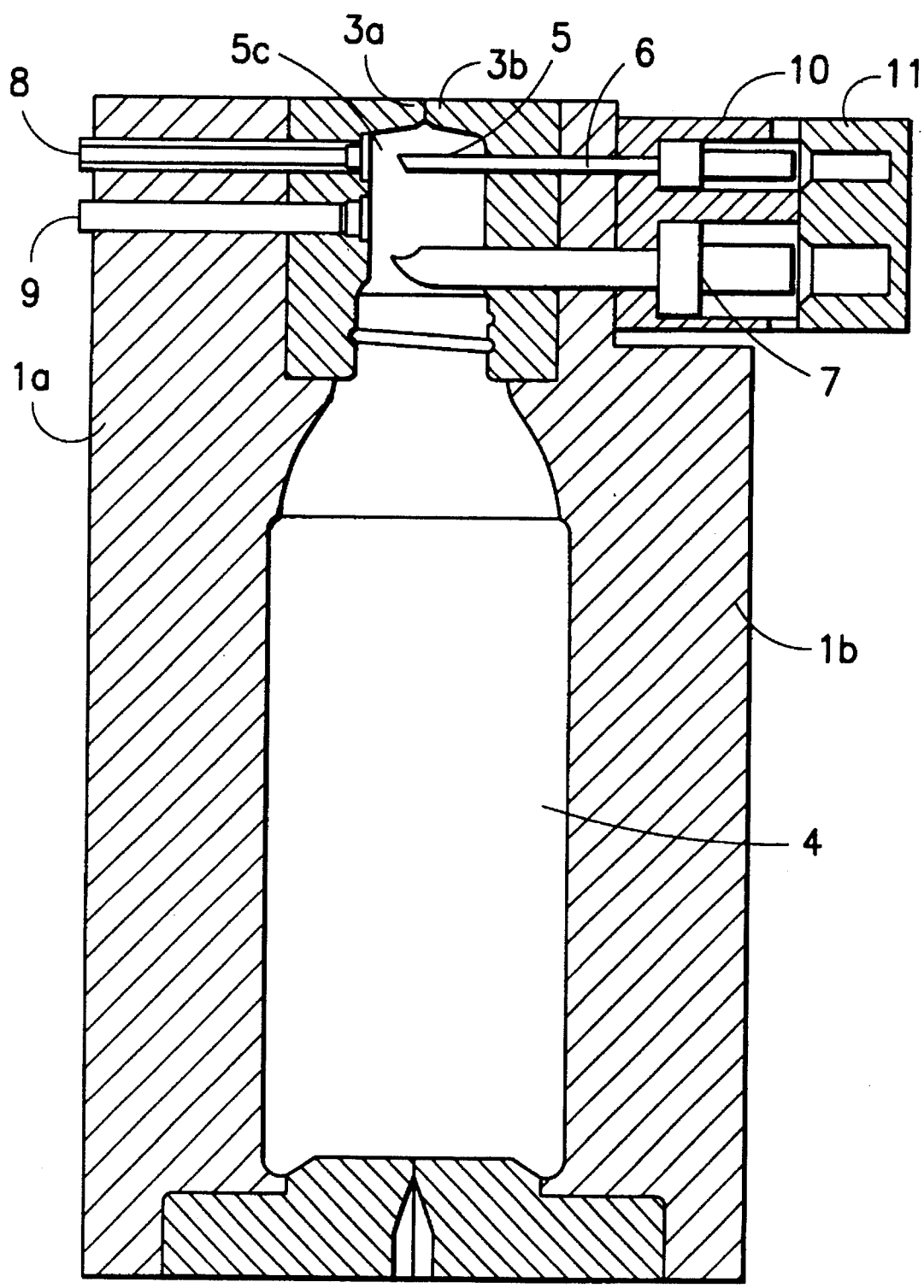
FIG. 2 is a section view of an embodiment of the present invention showing the split mold in a closed state and the hollow needles in an active (inserted) position.

Referring to FIG. 2, when split molds 1a and 1b are closed, cavity sections 4a and 4b form cavity 4 and flash cavity sections 5a and 5b form flash cavity 5. Pinch-off sections 3a and 3b seal parison top 2a and the portion of the extruded tube (not shown) that becomes parison bottom 2b of the next parison to enter the mold. The air or other fluid blown through small diameter hollow needle 6 and large diameter hollow needle 7 inflates parison 2 against the sides of the mold to form the hollow article. Exhaust opening formation mechanism 8 allows the injected air or other fluid to vent to the outside of parison 2 and the mold. After the hollow article cools sufficiently, knockout pin 9 removes the cooled hollow article from split mold 1b as split molds 1a and 1b separate. Flash section 5c is then trimmed. Flash section 5c is a section formed on an upper opening of the hollow article where small diameter hollow needle 6, large diameter hollow needle 7, exhaust opening formation mechanism 8, and knockout pin 9 are formed. Since flash section 5c is cut off after the blowing process, the final article bears no cosmetic damage caused by the production process.

Small diameter hollow needle 6 and large diameter hollow needle 7 move forward and backward between the inactive or retracted position shown in FIG. 1 and the active position shown in FIG. 2. Pressurized fluid supply mechanism 10 supplies pressurized fluid to parison 2 through small diameter hollow needle 6 and large diameter hollow needle 7. Control device 11 controls the timing of the movement of the hollow needles and the action of the fluid from a pressurized fluid source (not shown in the drawings) via pressurized fluid supply mechanism 10. In this embodiment, the fluid is used to move the hollow needles between the active and inactive positions in addition to being used to inflate parison 2.

Figure 3:
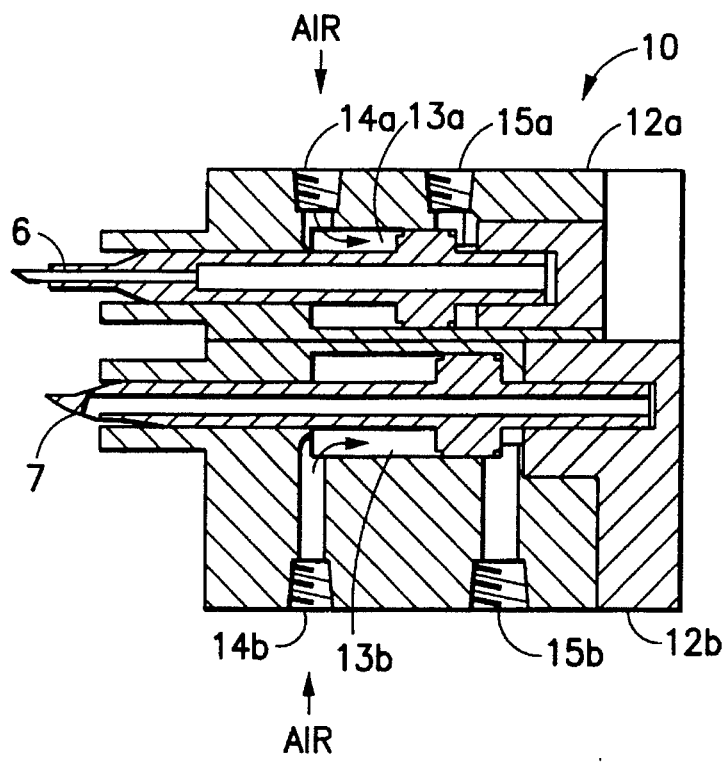
FIG. 3 is a detailed section view showing both of the hollow needles in an inactive position.

Referring to FIG. 3, small diameter hollow needle 6 and large diameter hollow needle 7 are forced to the rear of their respective fluid cylinders by fluid flowing from fluid supply openings 14a and 14b at the front of the cylinders. Small diameter hollow needle 6 and large diameter hollow needle 7 are in the inactive position. Small diameter hollow needle 6 and large diameter hollow needle 7 are held within fluid cylinders 13a and 13b respectively, which are included in drive devices 12a and 12b respectively. The hollow needles move forward and backward within these cylinders. Drive devices 12a and 12b also include fluid supply openings 14a, 14b, 15a, and 15b, which are formed on the sides of fluid cylinders 13a and 13b for supplying pressurized fluid. Fluid supply openings 14a and 14b pass through the front side of fluid cylinders 13a and 13b. Fluid supply openings 15a and 15b pass through the rear side of fluid cylinders 13a and 13b. The fluid supplied through these fluid supply openings either flows within the cylinders or flows from the back of each hollow needle to the front and into parison 2.

Drive device 12a for small diameter hollow needle 6 and drive device 12b for large diameter hollow needle 7 are arranged so that they can move in parallel. This permits the control mechanism and the pressurized fluid supply mechanism to be used in common, and also contributes to simplifying the devices required for supplying fluid and moving the hollow needles.

Figure 4:
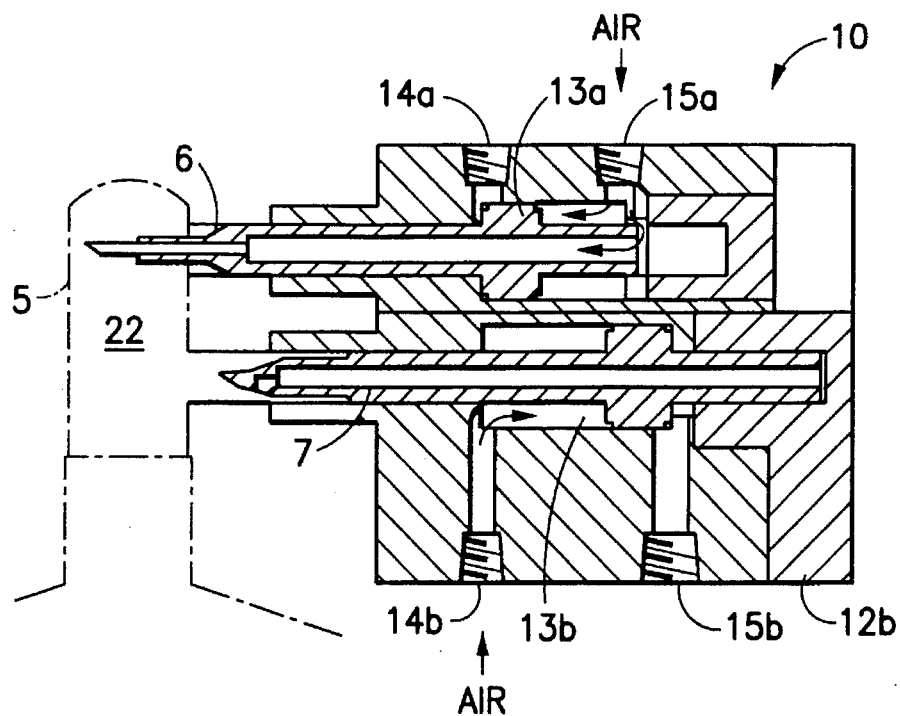
FIG. 4 is a detailed section view showing the small diameter hollow needle in the active position with a fluid being blown therethrough and the large diameter hollow needle in the inactive position.

Referring now to FIG. 4, fluid from fluid supply opening 14a is stopped and fluid from fluid supply opening 15a is started. Small diameter hollow needle 6 moves forward toward the parison and penetrates it in flash cavity 5. Once the rear end of small diameter hollow needle 6 clears fluid supply opening 15a, fluid flows through small diameter hollow needle 6 into parison 2, thereby creating internal pressure in balloon 22 inside the mold. Large diameter hollow needle 7 remains retracted since fluid is still supplied from fluid supply opening 14b which forces large diameter hollow needle 7 to the rear.

Figure 5:
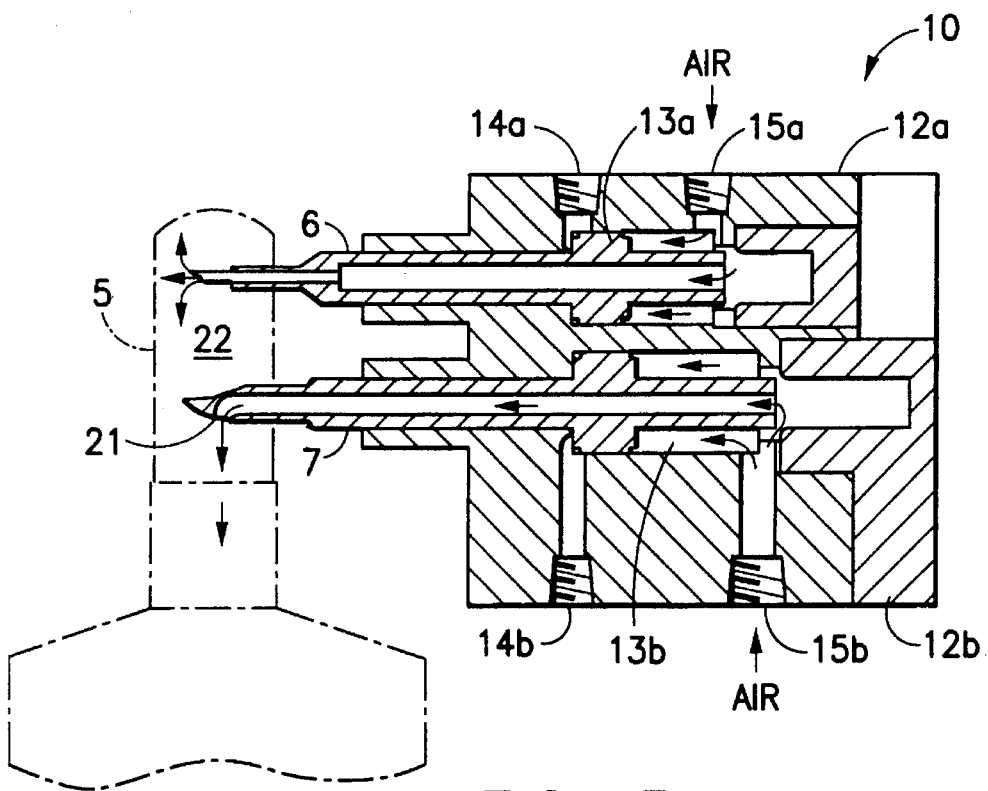
FIG. 5 is a detailed section view showing both hollow needles in the active position with fluid being blown through both needles.

Referring now to FIG. 5, fluid from fluid supply opening 14b to large diameter hollow needle 7 is stopped and fluid from fluid supply opening 15b is started. This causes large diameter hollow needle 7 to move forward to penetrate parison 2. Since the parison is given internal pressure which counteracts the elasticity of the wall of balloon 22, it is possible to insert large diameter hollow needle 7 shortly after small diameter hollow needle 6 is inserted. Once the rear end of large diameter hollow needle 7 clears fluid supply opening 15b, fluid flows through large diameter hollow needle into parison 2 and balloon 22, thereby greatly increasing the total rate of flow of fluid inside parison 2.

Figure 6:
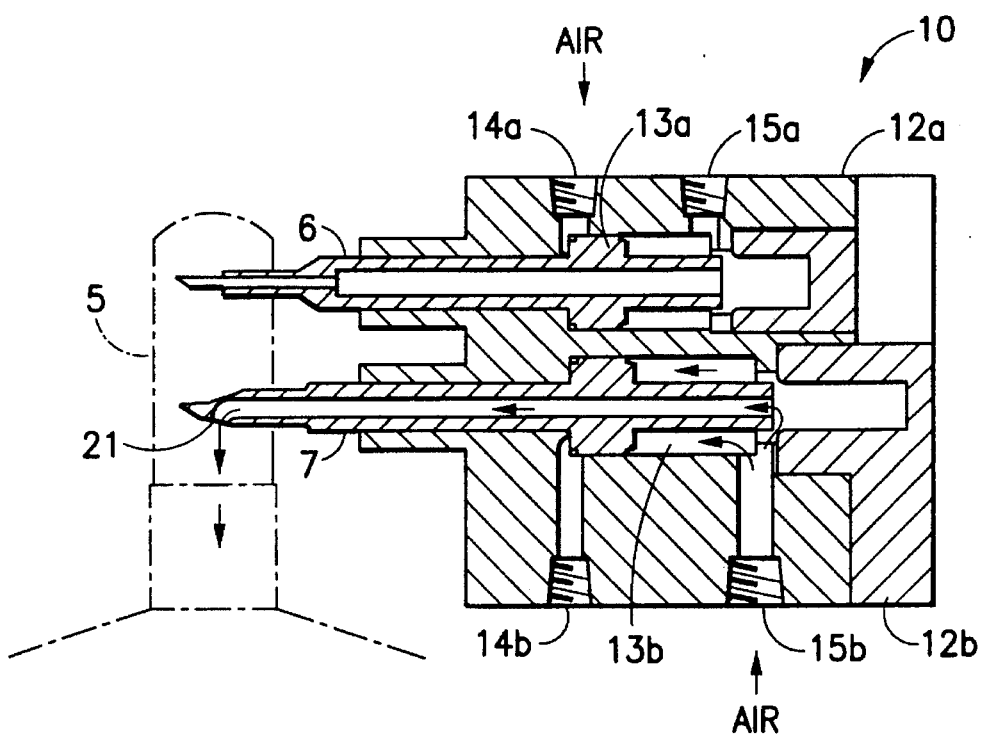
FIG. 6 is a detailed section view showing the small diameter hollow needle beginning to retract while fluid is still being blown through the large diameter hollow needle.

Referring now to FIG. 6, while fluid is being supplied to large diameter hollow needle 7 from fluid supply opening 15b, the fluid from fluid supply opening 15a to small diameter hollow needle 6 is stopped and fluid from fluid supply opening 14a is started. This causes small diameter hollow needle 6 to move to the rear. At the completion of the blowing cycle, large diameter hollow needle 7 retracts in a similar manner (not shown).

When expansion of the parison is almost complete, a small diameter exhaust opening is formed in order to circulate fluid blown into the parison. As shown in FIGS. 1–2, exhaust opening formation mechanism 8 includes a nozzle which is inserted into flash section 5c, where small diameter hollow needle 6 and large diameter hollow needle 7 are inserted. Exhausting the fluid through exhaust opening formation mechanism 8 while fluid is still being fed through large diameter hollow needle 7 increases the circulation of fluid inside the hollow article and enhances the cooling process. However, as noted in Japanese laid-open patent 59-3260, it is also possible to form an exhaust opening using the pressurized fluid within the upper pinch-off section of the split mold. After the fluids are exhausted, the shaped hollow article is removed from the mold using a knock-out pin such as knock-out pin 9. This completes the shaping of the hollow article.

Positioning large diameter hollow needle 7 more toward the parison body side than small diameter hollow needle 6, which is roughly centered within the diameter of flash cavity 5, makes it possible for the large amount of fluid blown in through large diameter hollow needle 7 to circulate more efficiently.

The well known small diameter needles used in conventional direct blow methods can also be used as the small diameter needle in the present invention. The orifice diameter of small diameter hollow needle 6 varies according to the size of the article to be formed, but generally the diameter is between 0.5 mm and 5 mm, and in particular, 1.5 mm to 3 mm is desirable.

The orifice diameter of large diameter hollow needle 7 is 3 to 15 times larger than that of small diameter hollow needle 6, and in particular, a factor of 4 to 10 is desirable. In other words, based on a conventional small diameter hollow needle 6 size between 0.5 mm and 5 mm, the orifice diameter of large diameter hollow needle 7 is 1.5 mm to 75 mm, and in particular, a diameter of 2.0 mm to 50 mm is desirable. A smaller diameter needle does not supply enough fluid for cooling and a larger diameter needle is very difficult to insert into the parison.

Unlike small diameter hollow needle 6, large diameter hollow needle 7 can be constructed so that the orifice through which fluid is blown is located other than at the tip of the needle. Thus, the orifice can be arranged at the side of large diameter hollow needle 7 instead of at the end. FIGS. 5–6 depict orifice 21 located on the side of large diameter hollow needle 7 which permits fluid to be blown into parison 2 in the direction of balloon 22, i.e., in the vertical axis direction. This arrangement allows the fluid to circulate efficiently within the parison body.

Figure 7A:
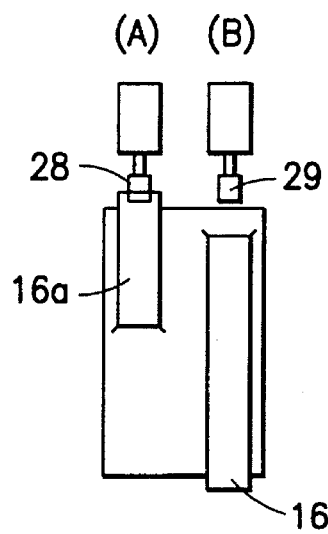
FIG. 7a is a side section view showing a cam control mechanism for controlling the timing of the movement of the hollow needles.
Figure 7B:
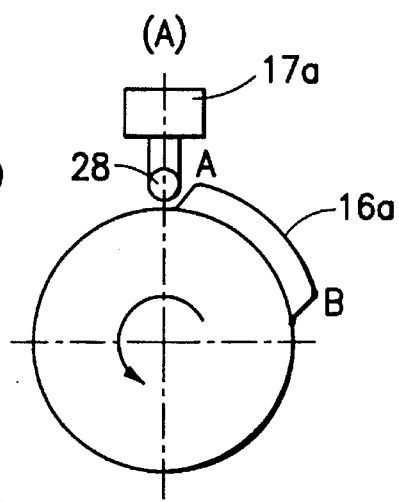
Figure 7C:
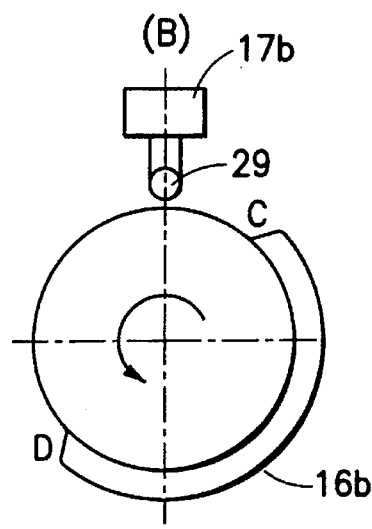

Referring to FIGS. 7a through 7c, an alternative embodiment is shown using cams instead of fluid pressure to control small diameter hollow needle 6 and large diameter hollow needle 7. Cam 16a controls the movement of small diameter hollow needle 6 via pilot valve 17a and cam 16b controls the movement of large diameter hollow needle 7 via pilot valve 17b. Pilot valves 17a and 17b are connected to a pressurized fluid supply (not shown). Cam 16a and cam 16b rotate in the direction indicated by the arrows in FIGS. 7b and 7c respectively.

The split mold closing position is 0 degrees (not shown). Small diameter hollow needle 6 and large diameter hollow needle 7 do not move while cams 16a and 16b are between 0 degrees and point A. When cam 16a reaches point A, cam roller 28 opens pilot valve 17a and small diameter hollow needle 6 is inserted into the parison by the action of the pressurized fluid. Fluid is blown into the parison from small diameter hollow needle 6 while cam 16a is between point A and point B thus applying an internal pressure to the parison. When cam 16b reaches point C, cam roller 29 opens pilot valve 17b and large diameter hollow needle 7 is inserted into the parison by the action of the pressurized fluid. Fluid is blown into the parison from large diameter hollow needle 7 while cam 16b is between point C and point D.

Figure 8:
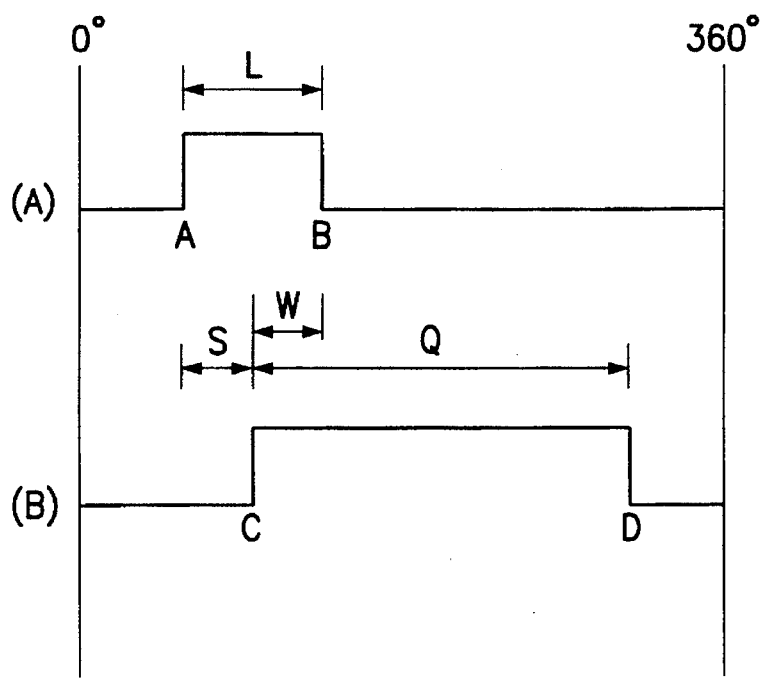
FIG. 8 is a timing diagram showing the relation between the cam movements shown in FIGS. 7a–7c and the injecting of fluid through the hollow needles.

Referring also to FIG. 8, the relation between the cam movements and the closing and opening of split molds 1a and 1b is depicted. The split mold closing position is 0° and the split mold opening position is 360°. When cam 16a reaches point A, small diameter hollow needle 6 is inserted into parison 2 and fluid is blown in. Fluid flows through small diameter hollow needle 6 during a time L. After a short time S, during which fluid is blown in through small diameter hollow needle 6 only, cam 16b has rotated to position C, and large diameter hollow needle 7 is inserted into parison 2. Large diameter hollow needle 7 penetrates the parison wall because the internal pressure created by small diameter hollow needle 6 counteracts the elasticity of the balloon wall. Fluid flows through large diameter hollow needle 7 during a time Q. During a time W, fluid flows into parison 2 through both hollow needles. Time W ends when cam 16a reaches point B and small hollow needle 6 retracts. Fluid continues to flow into parison 2 through large diameter hollow needle 7 until cam 16b reaches point D, at which point large diameter hollow needle 7 retracts.

The parison 2 expands during time L, forming the desired shape and size. For small articles, the inside of the shaped hollow article is cooled during time Q by the fluid blown through large diameter hollow needle 7. For large articles, some expansion of parison 2 continues during part of time Q, after which cooling occurs.

In the present invention, the time L is 0.4 to 12 seconds, and in particular, 1 to 4 seconds is desirable. The time S is 0.2 to 2 seconds, and in particular, 0.5 to 1 second is desirable. If time S is shorter than this interval, the internal pressure within parison 2 is inadequate to allow the insertion of large diameter hollow needle 7. If time S is longer than this interval, the production cycle is unnecessarily slowed down.

Time Q is 5 to 30 seconds, and in particular, 10 to 20 seconds is desirable. Time W is 0.2 to 10 seconds, and in particular, 0.5 to 5 seconds is desirable. If time W is shorter than this interval, the fluid supplied by large diameter hollow needle 7 may back up into small diameter hollow needle 6. If time W is longer than this interval, the production cycle is unnecessarily slowed down.

Figure 9:
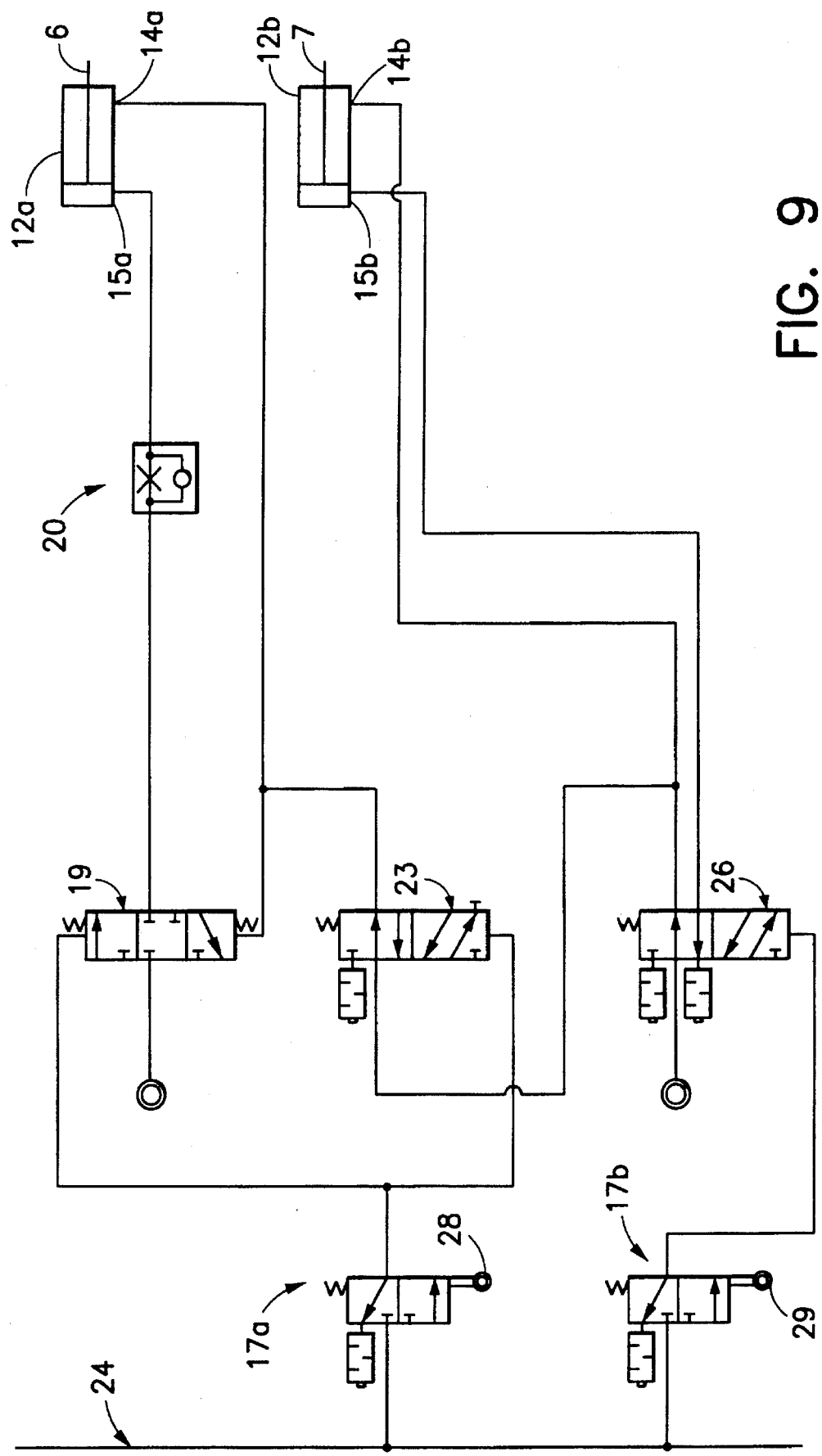
FIG. 9 is a valve diagram showing a control mechanism according to an embodiment of the present invention.

Referring now to FIG. 9, conventional valves and techniques are used for controlling the operation of the hollow needles according to an embodiment of the present invention. A pressurized fluid, such as compressed air or dry nitrogen, flows from fluid supply 24 to pilot valves 17a and 17b. Cam roller 28 controls pilot valve 17a, and in a like fashion, cam roller 29 controls pilot valve 17b. When pilot valve 17a is activated, fluid flows through master valve 19, through control valve 20, and into fluid supply opening 15a. Small diameter hollow needle 6 is thus moved forward. As pilot valve 17b is activated, fluid flows through master valve 6 and into fluid supply opening 15b. Large diameter hollow needle is thus moved forward.

When master valve 23 is activated by fluid from master valve 26, the fluid flow to small diameter hollow needle 6 is cut off. The role of master valve 23 is to ensure fluid is blown through small diameter hollow needle for a short period even after fluid begins blowing through large diameter hollow needle 7. This timing prevents the fluid inside the parison from backing up into small diameter hollow needle 6.

After cam 16a rotates to point B as shown in FIG. 7b, the fluid flow to small diameter hollow needle is stopped. Fluid continues to flow through large diameter hollow needle 7 until cam 16b rotates to point D in FIG. 7c. The exhaust opening formation mechanism 8 shown in FIG. 2 retracts shortly after fluid begins blowing through large diameter hollow needle 7, and the pressure of the fluid creates an opening in flash cavity 5c. Fluid continues to be blown through large diameter hollow needle 7 and circulates inside the hollow article before being exhausted. This fluid circulation cools the thermoplastic material quickly. After fluid is cut off by pilot valve 17b, large diameter hollow needle 7 and small diameter hollow needle 6 retract.

Any conventional control techniques, such as pneumatic, hydraulic, electronic, or digital, may be used to ensure the proper timing of the movement of the hollow needles and the blowing of fluid through the needles. For example, the timing of blowing the fluid through the hollow needles can be controlled using electronic timers.

Figure 10:
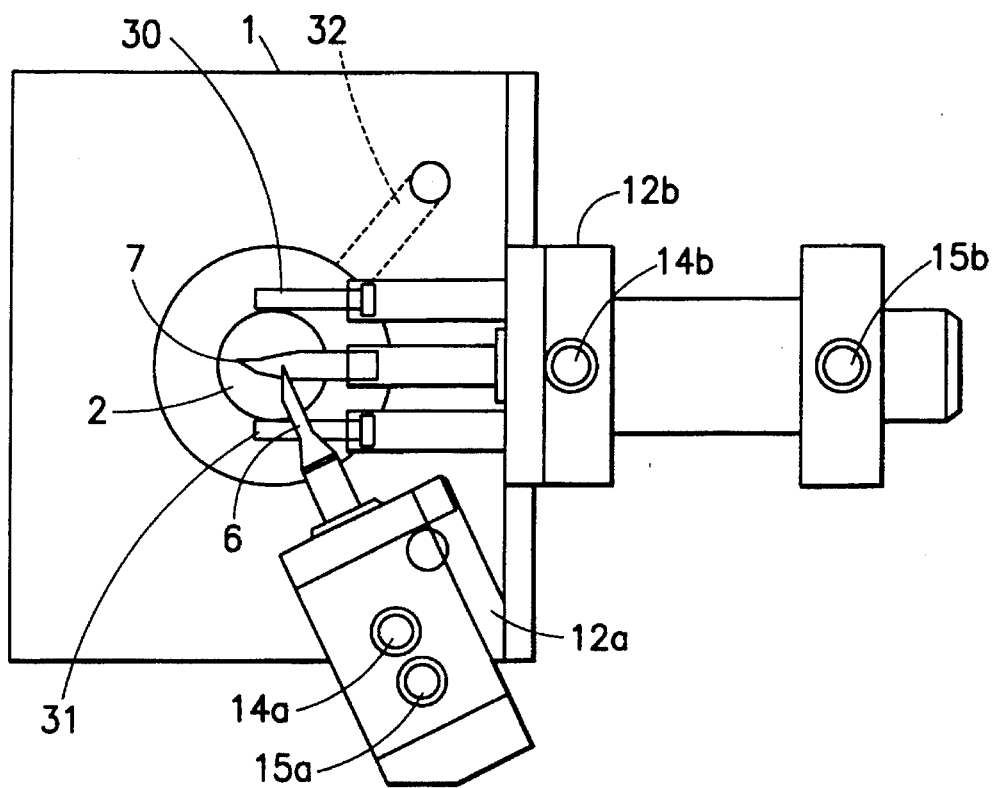
FIG. 10 is a detailed section view of the hollow needles inserted into the parison adjacent each other according to an alternative preferred embodiment.

Referring to FIG. 10, an alternative embodiment is shown in which the drive devices for the hollow needles are not parallel. When the drive devices are parallel, the minimum distance between the hollow needles equals the radius of drive device 12a plus the radius of drive device 12b. Instead, the hollow needles are disposed at angles to each other perpendicular to the article axis. Large diameter hollow needle 7 and small diameter hollow needle 6 are positioned so that they are angled with respect to each other instead of parallel to each other. This positioning allows large diameter hollow needle 7 and small diameter hollow needle 6 to be inserted into flash section 5c of parison 2 at close to the same longitudinal position on the article axis. The size of flash section 5c can thus be minimized. In an embodiment with large or bulky drive devices 12a and 12b, this arrangement allows the hollow needles to be positioned much closer to each other along the article axis than would otherwise be possible.

A cycle begins when parison 2 is moved into mold 1. Parison guide pins 30 and 31, shown extended for illustrative purposes only, are fully retracted into their respective cylinders at the beginning of the cycle. In a similar fashion, small diameter hollow needle 6 is fully retracted into drive device 12a and large diameter hollow needle 7 is fully retracted into drive device 12b at the beginning of the cycle. Cooling passage 32 allows cooling water to circulate inside the body of mold 1 to reduce the temperature. Drive devices 12a and 12b include fluid supply openings 14a, 14b, 15a, and 15b, which supply pressurized fluid. Fluid supply openings 14a and 14b pass through the front side of drive devices 12a and 12b. Fluid supply openings 15a and 15b pass through the rear side of drive devices 12a and 12b. Fluid flows through fluid supply openings 14a and 14b and does not flow through fluid supply openings 15a and 15b, thus keeping both needles in the inactive (retracted) position.

After parison 2 enters mold 1, parison guide pins 30 and 31 extend to hold parison 2 in place. After mold 1 is fully closed, parison guide pins 30 and 31 keep parison 2 centered while small diameter hollow needle 6 penetrates it. Other conventional means can be used as parison guides.

In the next step of the cycle, the fluid flowing through fluid supply opening 14a is stopped and fluid flow through fluid supply opening 15a is started. Small diameter hollow needle 6 moves forward toward the parison and penetrates it. Once the rear end of small diameter hollow needle 6 clears fluid supply opening 15a, the fluid flows through the inside of small diameter hollow needle 6 and into parison 2, thereby creating internal pressure inside parison 2. Large diameter hollow needle 7 remains in its inactive position while fluid is supplied from fluid supply opening 14b, thus forcing large diameter hollow needle 7 to the inactive position.

In the next step of the cycle, the fluid through fluid supply opening 14b to large diameter hollow needle 7 is stopped and fluid through fluid supply opening 15b is started. This causes large diameter hollow needle 7 to move forward to penetrate parison 2. The internal pressure provided by small diameter hollow needle 6 resists deformation of parison 2 when large diameter hollow needle 7 is inserted. Once the rear end of large diameter hollow needle 7 clears fluid supply opening 15b, fluid passes through large diameter hollow needle 7 inside parison 2, thereby greatly increasing the total rate of flow of fluid into parison 2. Parison 2 is blown to conform to the inner surface of mold 1 and then cools.

At the completion of the blowing cycle, the fluid through fluid supply openings 15a and 15b to small diameter hollow needle 6 and large diameter hollow needle 7 is stopped and fluid from fluid supply openings 14a and 14b is started. This causes small diameter hollow needle 6 and large diameter hollow needle 7 to retract for the beginning of the next cycle.

Figure 11:
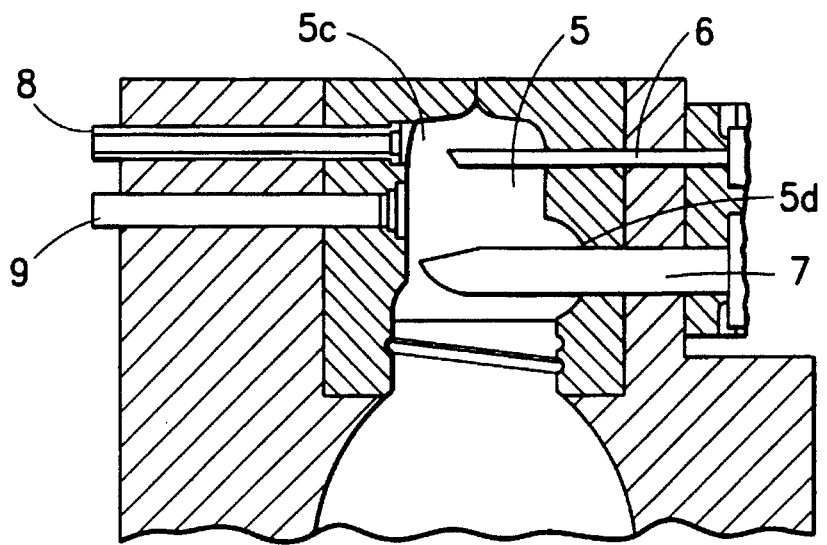
FIG. 11 is a section view depicting a thinning cavity inside the flash cavity according to an alternative embodiment of the invention.

Referring to FIG. 11, an alternative embodiment includes a thinning cavity 5d in flash cavity 5 which reduces the thickness of parison 2 at the site of large diameter hollow needle 7. Thinning cavity 5d is entirely within flash section 5c. Since the surface area of thinning cavity 5d is greater than the corresponding surface area of the hollow mold, the portion of parison 2 that is blown into thinning cavity 5d is thinner than the remainder of parison 2. Reducing the thickness of parison 2 at the site of large diameter hollow needle 7 further reduces the elasticity of the balloon wall and makes it easier for large diameter hollow needle to penetrate. A protrusion in the flash section (not shown) surrounding large diameter hollow needle 7 would have the same effect as thinning cavity 5d of increasing the surface area.

In an application using an embodiment of the present invention, a molten parison 2 extruded from an extruder is given a first blow through a small diameter hollow needle 6 for about 3 seconds within a blow mold (split mold) using room temperature air at a blow pressure of 6 kg/cm$^2$. About one second after the first blow is begun, a second blow is performed wherein a large diameter hollow needle 7 blows room temperature air at a blow pressure of 8 kg/cm$^2$ for about 9 seconds. After this, the pressurized air within the article is exhausted in approximately 0.1 seconds.

Compared to the prior art blow molding method using only one hollow needle, the blow molding method with the large and small hollow needles of the present invention reduces blow time by about 11 seconds and exhaust time by about 1.9 seconds. The molding cycle is improved about 60 percent.

Various conventional fluids can be used, and different fluids can be used for each hollow needle. Examples of conventional fluids include air, either room temperature or refrigerated, and liquid or gaseous carbon dioxide.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for blow molding hollow articles, comprising:

interposing a thermoplastic polymer parison between first and second split molds;

closing said first and second split molds thereby sealing first and second ends of said parison;

inserting a first hollow needle into said parison in a flash section near said first end;

blowing a fluid through said first hollow needle into said parison thereby forming a balloon by expanding said parison into a hollow space inside said closed split molds;

inserting a second hollow needle into said balloon in said flash section and between said first hollow needle and second end, said second hollow needle having a tip, a sidewall extending from said tip and an orifice located in said sidewall;

blowing said fluid through said second hollow needle, out said orifice and into said balloon thereby forming said hollow article, said hollow article having a flash section and said orifice being positioned so that said fluid is directed toward said second end and blowing said fluid so that said fluid circulates inside said balloon;

forming an exhaust opening in said flash section of said hollow article;

cooling said hollow article;

exhausting said fluid from said hollow article through said exhaust opening;

retracting said first hollow needle from said balloon or said hollow article;

retracting said second hollow needle from said hollow article;

opening said first and second split molds; and removing said hollow article from said first and second split molds.

2. A method according to claim 1, wherein an orifice diameter of said second hollow needle is between 3 and 15 times an orifice diameter of said first hollow needle.

3. A method according to claim 1, wherein:

said fluid is blown through said first hollow needle into said parison for a time L;

said fluid is blown through said second hollow needle into said balloon for a time Q;

said time Q begins a time S after said time L begins; and said time L and said time Q overlap for a time W whereby L=S+W.

4. A method according to claim 3, wherein said time S is between 0.2 seconds and 2 seconds.

5. A method according to claim 3, wherein said time L is between 0.4 seconds and 12 seconds.

6. A method according to claim 3, wherein said time Q is between 5 seconds and 30 seconds.

7. A method according to claim 3, wherein said time W is between 0.2 seconds and 10 seconds.

8. A method according to claim 3, wherein said blowing said fluid through said second hollow needle into said balloon is axially oriented with a major axis of said hollow article.

9. A method according to claim 3, wherein said first hollow needle and said second hollow needle are substantially in parallel.

10. A method according to claim 3, wherein said first hollow needle and said second hollow needle are angled to each other, whereby said first and second hollow needles are inserted into said balloon close to a same longitudinal position on an axis of said balloon.

* * * * *